United States Patent
Kim et al.

(10) Patent No.: US 9,592,746 B2
(45) Date of Patent: Mar. 14, 2017

(54) POWER NET SYSTEM OF FUEL CELL HYBRID VEHICLE AND CHARGE/DISCHARGE CONTROL METHOD

(71) Applicant: Hyundai Motor Company, Seoul (KR)

(72) Inventors: Sungdo Kim, Seongnam-si (KR); Dong Sup Ahn, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 651 days.

(21) Appl. No.: 14/098,784

(22) Filed: Dec. 6, 2013

(65) Prior Publication Data

US 2014/0175871 A1 Jun. 26, 2014

(30) Foreign Application Priority Data

Dec. 21, 2012 (KR) .................. 10-2012-0150506

(51) Int. Cl.
*B60L 1/00* (2006.01)
*B60L 11/18* (2006.01)

(52) U.S. Cl.
CPC ....... *B60L 11/1887* (2013.01); *B60L 11/1861* (2013.01); *Y02T 10/705* (2013.01); *Y02T 10/7044* (2013.01); *Y02T 90/34* (2013.01)

(58) Field of Classification Search
CPC .. B60L 11/1887; B60L 11/1861; Y02T 90/34; Y02T 10/705; Y02T 10/7044

USPC .......................................... 307/9.1
See application file for complete search history.

(56) References Cited

U.S. PATENT DOCUMENTS

| | | | | |
|---|---|---|---|---|
| 7,810,595 B2 * | 10/2010 | Moran | ............ | H01M 8/04089 180/65.31 |
| 2012/0056477 A1 | 3/2012 | Herges et al. | | |
| 2012/0226373 A1 * | 9/2012 | Tang | .................... | B23K 20/10 700/103 |
| 2012/0326504 A1 * | 12/2012 | Ballantine | ............ | H02J 3/006 307/24 |

FOREIGN PATENT DOCUMENTS

| | | | |
|---|---|---|---|
| KR | 10-0460881 B | | 12/2004 |
| KR | 10-0757143 B | | 9/2007 |
| KR | 1020090093281 | * | 2/2008 |
| KR | 10200040370 | * | 10/2008 |

* cited by examiner

*Primary Examiner* — Jared Fureman
*Assistant Examiner* — Duc M Pham
(74) *Attorney, Agent, or Firm* — McDermott Will & Emery LLP

(57) ABSTRACT

A power net system of a fuel cell hybrid vehicle includes a fuel cell and an electric vehicle battery (EV battery) connected with each other through a main bus terminal in parallel, and an insulated gate bipolar mode transistor (IGBT) connected to the EV battery and the main bus terminal. The power net system further includes an inverter connected to the main bus terminal and a driving motor connected to the inverter.

6 Claims, 2 Drawing Sheets

POWER NET SYSTEM OF FUEL CELL HYBRID VEHICLE AND CHARGE/DISCHARGE CONTROL METHOD

CROSS-REFERENCE TO RELATED APPLICATION

This application claims priority to and the benefit of Korean Patent Application No. 10-2013-0150506 filed in the Korean Intellectual Property Office on Dec. 21, 2012, the entire contents of which are incorporated herein by reference.

TECHNICAL FIELD

The present disclosure relates to a power net system of a fuel cell hybrid vehicle and a charge/discharge control method, and more particularly, to a power net system of a fuel cell hybrid vehicle and a charge/discharge control method capable of simplifying a structure and control.

BACKGROUND

A fuel cell hybrid vehicle, which is an environmentally-friendly future vehicle operated by continuously producing constant power by a fuel cell, and that employs an operation mode when the power is not sufficient, an electric vehicle (EV) battery auxiliary outputs a shortfall of power.

A voltage range of a fuel cell, which is a main power source, is greatly different from a voltage range of the EV battery, which is an auxiliary power source in the related art. Therefore, a bi-directional high voltage DC/DC converter (BHDC) is necessary in order to control charge and discharge of the EV battery. The BHDC includes input/output capacitors, input terminal inductors parallel with the capacitors, and six power switches. It also controls a bi-directional movement of the current according to a voltage command of an output terminal of a controller. The BHDC is interfaced with a control board, a switching mode power supply, a snubber circuit, and an input/output terminal branch high voltage connector. It employs a forced air cooling since regular current bi-directionally flows. The BHDC supplies voltage to a balance of plant (BOP) of the fuel cell by boosting the voltage of the EV battery when a vehicle starts. When the vehicle is in an idle state or is regenerative braking, the BHDC charges current to the EV battery, and the BHDC discharges current when a motor is running.

As described above, since the BHDC includes a plurality of constituent elements, the BHDC is manufactured as an independent component to be connected to a power net system by using a high voltage connector. Further, a control circuit has complex design due to the plurality of constituent elements, thus deteriorating stability and increasing volume, weight, and cost of the power net system.

The above information disclosed in this Background section is only for enhancement of understanding of the background of the disclosure, and therefore may contain information that does not form the prior art known in this country to a person of ordinary skill in the art.

SUMMARY

The present disclosure has been made in an effort to provide a power net system of a fuel cell hybrid vehicle and a charge/discharge control method capable of simplifying a structure, and thus reducing cost and improving stability.

A power net system of a fuel cell hybrid vehicle according to an exemplary embodiment of the present disclosure includes a fuel cell and an electric vehicle (EV) battery connected with each other through a main bus terminal in parallel. An insulated gate bipolar mode transistor (IGBT) is connected to the EV battery and the main bus terminal. An inverter is connected to the main bus terminal, and a driving motor is connected to the inverter.

There may be one IGBT.

The fuel cell and the EV battery may have the same level of voltage ranges.

When the IGBT is turned on, the EV battery may be charged.

According to another exemplary embodiment of the present disclosure, a charge/discharge control method of charging and discharging a fuel cell hybrid vehicle comprises a fuel cell and an electric vehicle battery (EV battery) connected with each other through a main bus terminal in parallel. An insulated gate bipolar mode transistor (IGBT) is connected to the EV battery and the main bus terminal. An inverter is connected to the main bus terminal, and a driving motor is connected to the inverter. The charge/discharge control method includes monitoring a state of the EV battery to charge the EV battery by turning on the IGBT when necessary, and turn off the IGBT when the EV battery is over-charged.

In a case where the vehicle is in a standby or regenerative braking state, the EV battery may be charged by turning on the IGBT until the state of charge reaches a maximum limit. The IGBT may be turned off when the state of charge reaches the maximum limit.

In a case where a quantity of demanded torque is increased in a motor driving state of the vehicle, an output may be provided to the driving motor by discharging the EV battery according to the quantity of demanded torque.

When the state of charge reaches a minimum limit by discharging of the EV battery, the EV battery may be charged back, or the driving motor may be derated by turning on the IGBT.

The power net system according to the exemplary embodiment of the present disclosure, the control circuit can be simplified to improve stability by substituting the bi-directional high voltage DC/DC converter (BHDC) with the insulated gate bipolar mode transistor (IGBT). Further, fuel efficiency and cost can be improved by decreasing volume and weight of the power net system. The IGBT may be installed by a simple method, and the control thereof may also be implemented without a significant change in an existing logic. Further, the loss generated when the IGBT is turned on/off may be utilized at the time of cooling.

DETAILED DESCRIPTION OF THE EMBODIMENTS

Hereinafter, an exemplary embodiment of the present disclosure will be described in detail with reference to the accompanying drawings. However, the present disclosure is not limited to the exemplary embodiment, and may be modified in various forms.

Figure 1:
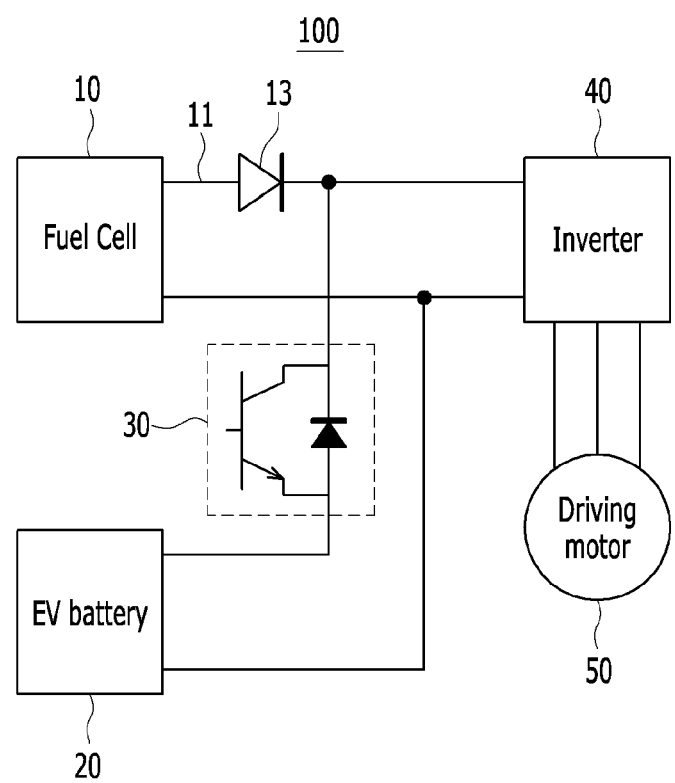
FIG. 1 is a configuration diagram illustrating a power net system of a fuel cell hybrid vehicle according to an exemplary embodiment of the present disclosure.

FIG. 1 is a configuration diagram illustrating a power net system of a fuel cell hybrid vehicle according to an exemplary embodiment of the present disclosure.

Referring to FIG. 1, a power net system 100 of a fuel cell hybrid vehicle includes a fuel cell 10 and an electric vehicle battery (EV battery) 20 connected through a main bus terminal 11 in parallel. An insulated gate bipolar mode transistor (IGBT) 30 is connected to the EV battery 20, an inverter 40 is connected to the main bus terminal 11, and a driving motor 50 is connected to the inverter 40.

The fuel cell 10 is used as a main power source of a vehicle, and the EV battery 20 is used as an auxiliary power source. In the present exemplary embodiment, the fuel cell 10 and the EV battery 20 have a same level of voltage ranges. The same level means a degree at which abnormality is not generated in a circuit even though the fuel cell 10 is connected in parallel with the EV battery 20 through the IGBT 30. For example, the same level may be defined as a level at which a voltage range of the EV battery 20 to a voltage of the fuel cell 10 is 80 to 120%, but the present disclosure is not limited thereto. Accordingly, the definition of the same voltage may be differently set in each power net system 100.

A reverse blocking diode (RBD) 13 for preventing reverse current from flowing to the fuel cell 10 is installed in the main bus terminal 11. The reverse blocking diode 13 is mounted on a forced water cooling plate in a junction box to connect components with each other.

The IGBT 30 controls charge or discharge of the EV battery 20. In more detail, the IGBT 30 turns on/off flow of high current in one direction, and current may regularly flow in the opposite direction. In a case where the IGBT 30 is in on-state, the EV battery 20 may be both discharged and charged through the IGBT 30. When the IGBT 30 is in off-state, the EV battery 20 may be only discharged.

The inverter 40 is connected to the main bus terminal 11, which is an output terminal of the fuel cell 10 and the EV battery 20, to convert DC power provided from the fuel cell 10 or the EV battery 20 into AC power and provide the converted AC power to the driving motor 50.

The driving motor 50 is connected to the inverter 40 to convert electrical energy of the AC power provided from the inverter 40 into rotary kinetic energy.

Hereinafter, a method of controlling the vehicle by using the aforementioned power net system 100 will be described in detail.

Figure 2:
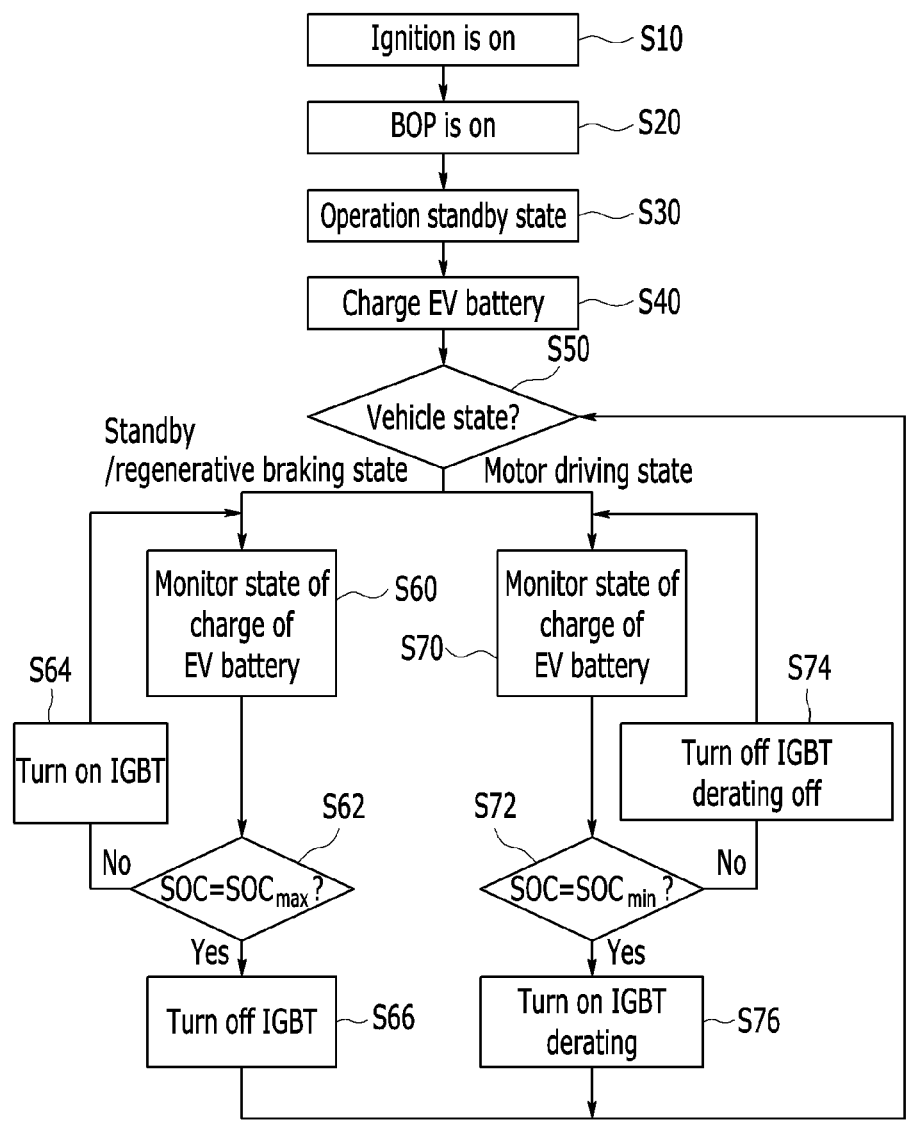
FIG. 2 is a configuration diagram illustrating a method of controlling the power net system of the fuel cell hybrid vehicle according to the exemplary embodiment of the present disclosure.

FIG. 2 is a configuration diagram illustrating a method of controlling the power net system 100 of the fuel cell hybrid vehicle according to the exemplary embodiment of the present disclosure.

First, when an ignition is on (IG on), the IGBT 30 connects the EV battery 20 with the main bus terminal 11 (S10).

Next, a precharge resistor assembly (PRA) of the EV battery 10 is turned on, applying high voltage to the main bus terminal 11. A balance of plant (BOP), such as a sensor and a sort of pumps for collecting air, heat, and the like, is turned on (S20).

The balance of plant supplies hydrogen and oxygen up to an open circuit voltage of the fuel cell 10 to activate the fuel cell 10. When the activation of the fuel cell 10 is completed, the balance of plant and various vehicle chassis main components become an operation standby state (S30).

As described above, when the operation standby state is generated, the EV battery 20 is charged (S40). This is determined by a potential difference between the fuel cell 10 and the EV battery 20.

A state of the vehicle in the operation standby state is determined at step S50, and the vehicle is operated according to the state.

That is, in the standby/regenerative braking state, a state of charge (SOC) of the EV battery 20 is monitored (S60) to determine whether the state of charge (SOC) reaches a maximum limit $SOC_{max}$ (S62). If the state of charge (SOC) of the EV battery 20 does not reach the maximum limit $SOC_{max}$, the IGBT 30 is turned on to charge the EV battery 20 (S64). When the state of charge (SOC) of the EV battery 20 reaches the maximum limit $SOC_{max}$ (that is, the EV battery 20 is overcharged), the IGBT 30 is turned off (S66). Here, if the state of charge (SOC) of the EV battery 20 is within a predetermined range of the maximum limit $SOC_{max}$, the state of charge (SOC) of the EV battery 20 may reach the maximum limit $SOC_{max}$. Then, the state of the vehicle repeatedly performs a necessary step.

In a motor driving state, the driving motor 50 is driven by the fuel cell 10 outputs. If a quantity of demanded torque is increased, the output of the EV battery 20 is provided together with the output of the fuel cell 10 by discharging the EV battery 20 through a freewheeling diode of the IGBT 30, driving the driving motor 50 and dropping the state of charge of the EV battery 20. The EV battery 20 is monitored (S70) to determine whether the state of charge (SOC) of the EV battery 20 reaches a minimum limit $SOC_{min}$ (S72). Here, when the state of charge (SOC) of the EV battery 20 is within a predetermined range of the minimum limit $SOC_{min}$, the state of charge (SOC) of the EV battery 20 may reach the minimum limit $SOC_{min}$. If the state of charge (SOC) of the EV battery 20 does not reach the minimum limit $SOC_{min}$, the IGBT 30 is turned off, and/or derating of the driving motor 50 is turned off (S74). When the state of charge (SOC) of the EV battery 20 reaches the minimum limit $SOC_{min}$, the EV battery 20 is charged by turning on the IGBT 30, and/or the driving motor 50 is derated by lowering a torque command of the driving motor 50 (S76). The state of the vehicle then repeatedly performs a necessary step.

As described above, the BHDC is substituted with an IGBT 30 by maintaining the same level of the voltage ranges of the fuel cell 10 and the EV battery 20. However, in the related art, the bi-directional high voltage DC/DC converter (BHDC) is necessary due to the voltage difference between the fuel cell 10 and the EV battery 20. Accordingly, simplifying the control circuit to promote stability of the system and reducing volume, weight, and cost to secure a package are possible. Further, fuel efficiency can be improved by removing an inductor that is a constituent component of the existing BHDC.

In the related art, the BHDC, which is an independent component, is connected to the main bus terminal 11 through a high voltage connector. However, in the present exemplary embodiment, the IGBT 30 may be simply mounted in the junction box to connect power between the components by using the forced water cooling plate in which the reverse blocking diode 13 is disposed. Accordingly, the IGBT 30 may be mounted without adding a separate housing and the like.

Further, a loss is generated when the IGBT 30 is turned on/off. A value obtained by multiplying a collector-emitter terminal voltage saturation constant varied according to a current value of the collector by current corresponds to the loss, and the value may be utilized at the time of cooling by calculating the value as a heating value.

In the related art, the BHDC controls an output terminal voltage by receiving a voltage command value from a controller through a controller area network (CAN). However, according to the present exemplary embodiment, the controller receives the monitored value of the state of charge of the EV battery 20 through the CAN and uses the received value for power calculation. Therefore, the control of the IGBT 30 may be implemented without a significant change by sending an on/off command of the IGBT 30 by using the CAN.

The power net system according to the embodiment of the present disclosure simplifies the control circuit to improve stability by substituting the BHDC with the IGBT 30. Further, the power net system improves fuel efficiency and reduces cost by decreasing volume and weight of the power net system. Here, the IGBT 30 may be mounted by a simple method, and the control thereof may also be implemented without a significant change in an existing logic. Further, the loss generated when the IGBT is turned on/off may be utilized at the time of the cooling.

The aforementioned characteristic, structure, effect, and the like are included in at least one exemplary embodiment of the present disclosure, and are not essentially limited to only one exemplary embodiment. The characteristic, structure, effect, and the like described in each exemplary embodiment may be carried out in other exemplary embodiments through combination or modification by those skilled in the art to which the exemplary embodiments pertain. Accordingly, it shall be construed that contents relating to the combination and the modification are included in the scope of the present disclosure.

What is claimed is:

1. A power net system of a fuel cell hybrid vehicle, comprising:
   a fuel cell and an electric vehicle (EV) battery connected each other through a main bus terminal in parallel;
   an insulated gate bipolar mode transistor (IGBT) connected to the EV battery and the main bus terminal;
   an inverter connected to the main bus terminal; and
   a driving motor connected to the inverter,
   wherein the EV battery is charged when the IGBT is turned on.

2. The power net system of claim 1, wherein:
   the number of the IGBT is one.

3. The power net system of claim 1, wherein:
   the fuel cell and the EV battery have a same level of voltage ranges.

4. A charge/discharge control method of a fuel cell hybrid vehicle
   comprising:
   monitoring a state of charge of the EV battery;
   charging the EV battery by turning on the IGBT when the EV battery needs to be charged; and
   discharging the EV battery by turning off the IGBT when the EV battery is over-charged.

5. The charge/discharge control method of claim 4, wherein:
   in a case where the vehicle is in a standby or regenerative braking state, the EV battery is charged by turning on the IGBT until the state of charge reaches a maximum limit, and the IGBT is turned off when the state of charge reaches the maximum limit.

6. The charge/discharge control method of claim 4, wherein:
   in a case where a quantity of demanded torque is increased in a motor driving state of the vehicle, output according to the quantity of demanded torque is provided to the driving motor by discharging the EV battery, and when the state of charge reaches a minimum limit by the discharging of the EV battery, the EV battery is charged, or the driving motor is derated by turning on the IGBT.

\* \* \* \* \*